(12) United States Patent
Schwarzkopf

(10) Patent No.: US 6,252,210 B1
(45) Date of Patent: Jun. 26, 2001

(54) ELECTRICAL SLEEVE HEATER WITH BUILT-IN THERMAL SENSOR

(75) Inventor: Eugen Schwarzkopf, Lüdenscheid (DE)

(73) Assignee: Hotset Heizpatronen u.Zubehor GmbH, Ludenscheid (DE)

( * ) Notice: Subject to any disclaimer, the term of this patent is extended or adjusted under 35 U.S.C. 154(b) by 0 days.

(21) Appl. No.: 09/657,725

(22) Filed: Sep. 8, 2000

(30) Foreign Application Priority Data

Sep. 9, 1999 (DE) .............................................. 199 43 192

(51) Int. Cl.[7] .............................. H05B 3/44; H05B 3/58; F16L 13/02
(52) U.S. Cl. .......................... 219/544; 219/535; 285/21.2
(58) Field of Search ................................... 219/535, 544; 285/21.1–21.3, 22, 285.1; 425/542, 547, 549; 138/33, 155, 156

(56) References Cited

U.S. PATENT DOCUMENTS

| | | | |
|---|---|---|---|
| 3,849,630 | * | 11/1974 | Halliday ................................ 219/535 |
| 3,943,334 | * | 3/1976 | Sturn ..................................... 219/544 |
| 4,176,274 | * | 11/1979 | Lippera ................................. 219/522 |
| 4,493,985 | * | 1/1985 | Keller ................................... 219/535 |
| 5,360,333 | * | 11/1994 | Schmidt ............................... 425/549 |
| 5,558,888 | * | 9/1996 | Beck .................................... 425/549 |
| 5,632,919 | * | 5/1997 | MacCracken et al. .............. 219/529 |
| 6,025,577 | * | 2/2000 | Schwarzkopt ....................... 219/535 |
| 6,043,466 | * | 3/2000 | Jenko et al. ......................... 219/535 |

* cited by examiner

Primary Examiner—Sang Paik
(74) Attorney, Agent, or Firm—Herbert Dubno; Andrew Wilford

(57) ABSTRACT

An electrical sleeve heater has an inner tube centered on an axis and formed with an axially extending and radially inwardly open cutout open at an axial end of the tube, an electrical heater coil wound around the tube, an outer tube engaged around the heater coil and tube, and an axially elongated thermal sensor probe having a sleeve and a pair of wires extending axially in the sleeve fitted in the cutout. The inner tube has substantially cylindrical inner and outer surfaces and the thermal sensor probe has a radial thickness smaller than a radial distance between the inner and outer surfaces.

9 Claims, 1 Drawing Sheet

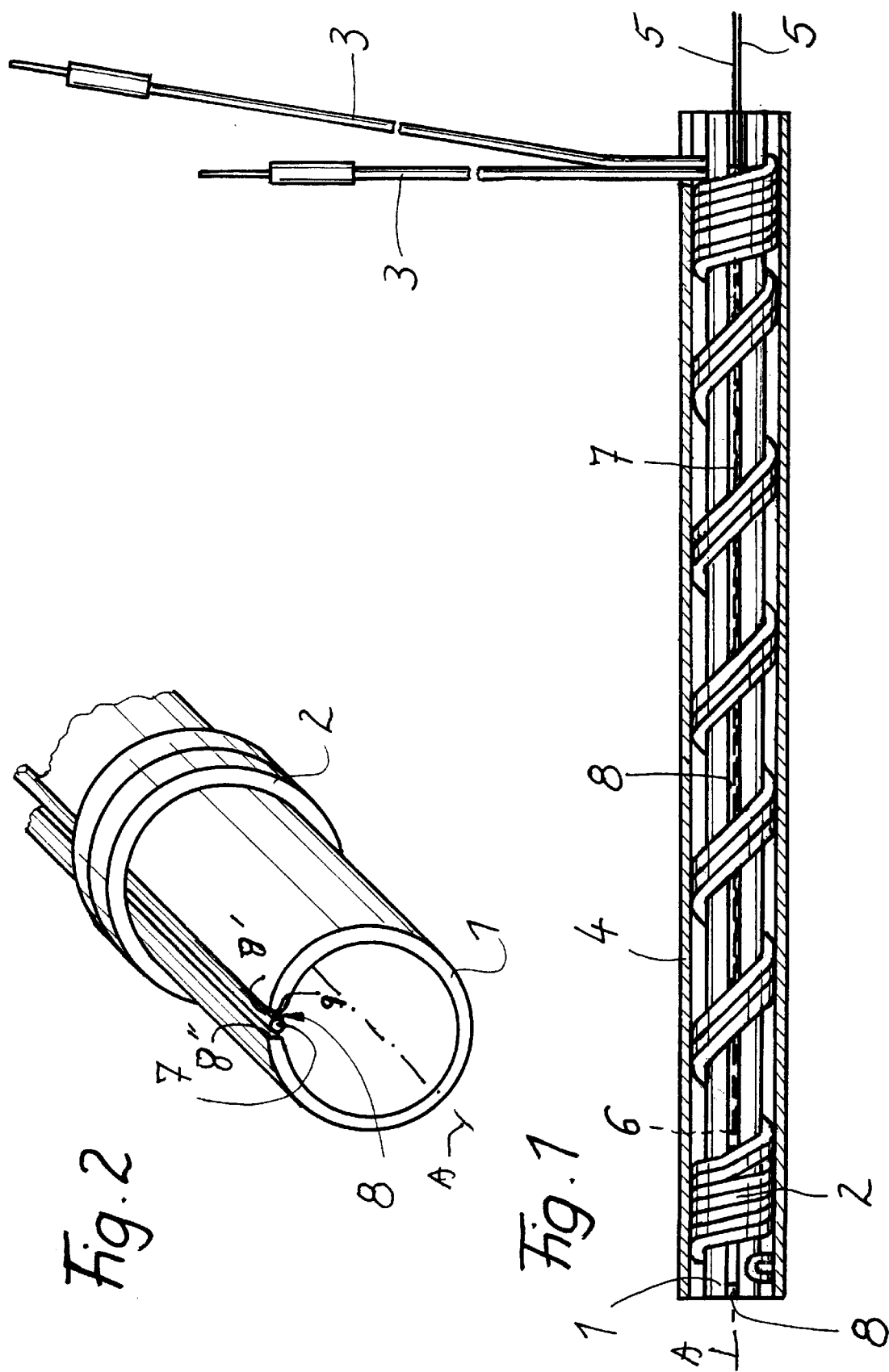

ELECTRICAL SLEEVE HEATER WITH
BUILT-IN THERMAL SENSOR

SPECIFICATION

FIELD OF THE INVENTION

The present invention relates to an electrical sleeve heater. More particularly this invention concerns a tubular heater that is slipped, for example, over an injection-molding nozzle to maintain it at a predetermined temperature.

BACKGROUND OF THE INVENTION

A standard electrical sleeve heater has an inner tube centered on an axis, an electrical heater coil wound around the inner tube, and an outer tube engaged around the heater coil and inner tube. The inner tube is typically formed of a good heat conductor such as copper or brass and the outer tube of a poor heat conductor such as stainless steel. The heater coil is a resistance wire extending in a ceramic powder (MgO) inside a metallic sleeve and has ends extending out one end of the heater.

In order that such a heater can be used for accurate temperature control, it is necessary to provide it or the part being heated with a thermal sensor probe. A typical such sensor probe comprises a pair of constantan wires whose inner ends are connected to leads leading to the control circuitry and whose outer ends are fused together. These wires extend through a thin-walled sleeve of heat conductive material and can produce a millivolt output that is directly proportional to the temperature at the fused ends. The control circuit energizes the heater coil in accordance with the temperature detected by the sensor probe.

Accommodating the thin sensor probe in the sleeve heater is very difficult. There is little room between the coil and the inner tube and often no space at all between the inner tube and the object it is fitted over. If the sensor probe is mounted in place in such a heater it is invariably permanently fixed in position. Thus the critical temperature-sensing end of the sensor probe is often positioned in a disadvantageous location that is not critical to the operation of the system.

OBJECTS OF THE INVENTION

It is therefore an object of the present invention to provide an improved electrical sleeve heater with a temperature sensor probe.

Another object is the provision of such an improved electrical sleeve heater with a temperature sensor probe which overcomes the above-given disadvantages, that is which neatly incorporates the sensor probe and that, if necessary, allows the position of the sensor probe to be changed or even allows the sensor probe to be replaced if necessary.

SUMMARY OF THE INVENTION

An electrical sleeve heater has according to the invention an inner tube centered on an axis and formed with an axially extending and radially inwardly open cutout open at an axial end of the tube, an electrical heater coil wound around the tube, an outer tube engaged around the heater coil and tube, and an axially elongated thermal sensor probe having a sleeve and a pair of wires extending axially in the sleeve fitted in the cutout.

Thus with this system the sensor probe is incorporated in the sensor probe within the coil so it will detect the temperature right where it is applied. At the same time the sensor probe does not complicate construction of the device and the heater coil can completely fill the space between the outer surface of the inner tube and the inner surface of the outer tube.

The inner tube according to the invention has substantially cylindrical inner and outer surfaces and the thermal sensor probe has a radial thickness smaller than a radial distance between the inner and outer surfaces. Thus the sensor probe lies wholly within the outlines of the inner tube, neither projecting inward into the space to be occupied by the object being heated nor outward into the space used by the heater coil.

The cutout has an angularly directed edge and according to the invention the sensor probe to the edge. This can be done adhesively or by fusion of the sensor-probe sleeve.

The sensor probe sleeve has a predetermined diameter and the cutout has a pair of angularly confronting edges spaced angularly apart by a distance greater than the diameter. Thus some thermal expansion of the inner tube can be tolerated without problems. In accordance with the invention the sensor probe sleeve has a diameter or at most about 1 mm and a wall thickness of about 0.15 mm and the outer tube fits tightly around the heater coil.

The cutout according to the invention is an axially full-length and radially through going slot. It can also be a radially inwardly open groove formed in the inner tube. In any case the sensor probe is a loose fit in the cutout and is axially slidable therein.

BRIEF DESCRIPTION OF THE DRAWING

The above and other objects, features, and advantages will become more readily apparent from the following description, reference being made to the accompanying drawing in which:

FIG. 1 is an axial section through the heater according to the invention; and

FIG. 2 is a large-scale perspective end view of the heater with its outer tube removed for clarity of view.

SPECIFIC DESCRIPTION

As seen in FIGS. 1 and 2 an electrical sleeve heater according to the invention has a cylindrical inner tube 1 made of copper or brass, centered on an axis A, and dimensioned to be slipped over an object, for instance an injection-molding nozzle, to be heated. An electrical heating wire 2 is wound helicoidally around the outside of the inner tube 1 and has a pair of electrical-connector ends 3 that extend out of one end of the heater for connection to an electrical source. An outer tube 4 of a material such as stainless steel that is less conductive than the inner tube 1 is fitted over the outside of the heater coil 2 so as to press it radially inward against the tube 1 and to form the assembly into a compact cylindrically tubular assembly.

According to the invention the tube 1 is formed with an axially full-length radially through going slot 8 having a pair of axially extending and angularly confronting edges 8' and 8". A temperature sensor probe in the form of a pair of constantan wires 5 having ends welded together at 6 and received in a thin tube 7 is received in this slot 8. The tube 7 engages the one edge 8' and is spaced from the other edge 8" and may even be fused or secured by adhesive 9 to the edge 8'. If not fastened, the tube 8 remains axially slidable in the slot 8 so that its end 6 can be set at any axial position therein. To this end the diameter of the cylindrical tube 7 is less than a radial thickness of about 1 mm of the outer tube 2, the tube 7 having a wall thickness of about 0.15 mm.

Thus with this system the thermocouple subassembly 5, 6, 7 is neatly integrated into the sleeve heater without interfering in any way with its use or operation. In addition it can even be moved axially and replaced if necessary.

I claim:

1. An electrical sleeve heater comprising:

an inner tube centered on an axis and formed with an axially extending and radially inwardly open cutout open at an axial end of the tube;

an electrical heater coil wound around the tube;

an outer tube engaged around the heater coil and tube; and an axially elongated thermal sensor probe having a sleeve and a pair of wires extending axially in the sleeve fitted in the cutout.

2. The electrical sleeve heater defined in claim 1 wherein the inner tube has substantially cylindrical inner and outer surfaces and the thermal sensor probe has a radial thickness smaller than a radial distance between the inner and outer surfaces.

3. The electrical sleeve heater defined in claim 1 wherein the cutout has an angularly directed edge, the heater further comprising means adhering the sensor probe to the edge.

4. The electrical sleeve heater defined in claim 1 wherein the sensor probe sleeve has a predetermined diameter and the cutout has a pair of angularly confronting edges spaced angularly apart by a distance greater than the diameter.

5. The electrical sleeve heater defined in claim 1 wherein the sensor probe sleeve has a diameter or at most about 1 mm and a wall thickness of about 0.15 mm.

6. The electrical sleeve heater defined in claim 1 wherein the outer tube fits tightly around the heater coil.

7. The electrical sleeve heater defined in claim 1 wherein the cutout is an axially full-length and radially through going slot.

8. The electrical sleeve heater defined in claim 1 wherein the sensor probe is a loose fit in the cutout and is axially slidable therein.

9. An electrical sleeve heater comprising:

an inner tube centered on an axis, having a predetermined radial thickness, and formed with an axially extending and radially through going slot open at an axial end of the tube and having a pair of edges separated angularly by a predetermined spacing;

an electrical heater coil wound snugly around the tube;

an outer tube engaged snugly around the heater coil and tube; and an axially elongated thermal sensor probe having a sleeve and a pair of wires extending axially in the sleeve fitted in the cutout, the sleeve having a diameter smaller than the radial thickness of the inner tube and the angular spacing of the slot edges.

* * * * *